Feb. 11, 1941. E. HAEFFNER Re. 21,712

BRACELET CONSTRUCTION

Original Filed April 17, 1935

INVENTOR

Emil Haeffner

BY Blair Curtis & Dunne

ATTORNEY

Patented Feb. 11, 1941

Re. 21,712

UNITED STATES PATENT OFFICE 21,712

BRACELET CONSTRUCTION

Emil Haeffner, Newark, N. J., assignor to Gemex Company, Newark, N. J., a corporation of New Jersey Original No. 2,157,076, dated May 2, 1939, Serial No. 16,784, April 17, 1935. Application for reissue July 19, 1940, Serial No. 346,433

7 Claims. (Cl. 24—71)

This invention relates to a bracelet construction and more particularly to a buckle characterized by a plurality of folding links or the like.

One of the objects of this invention is to provide a buckle which will be simple, practical and thoroughly durable. Another object is to provide a device of the above character which may be manufactured from inexpensive materials at low labor cost. Another object is to provide a device of the above character in which the operating parts may be easily assembled and in which the completed article is attractive in appearance. Another object is to provide a buckle of the above character capable of quick release to give a maximum dimension to the bracelet while still effecting a very minute adjustment of the length thereof when so desired. Another object is to provide a device of the above character having a fingerpiece in a readily accessible position for operation. Another object is to provide a device of the above character in which the various operating parts work with extreme ease so that changes in the length of the bracelet may be conveniently effected. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing, in which is shown one of the various possible embodiments of this invention, Figure 1 is a top plan view of my buckle with the links thereof in unfolded position;

Similar reference characters refer to similar parts throughout the several views of the drawing.

To afford a clearer understanding of several of the features of this invention, some of the difficulties encountered in buckles of this general character now in use will be described. Some of these buckles have no release for the pawl and ratchet when the links are in folded position and accordingly if the wearer decides to increase the length of the bracelet it is necessary to unfold the links, resulting in inconvenience. Other buckles of this general character are provided with actuating apparatus such as fingerpieces so located that it is extremely difficult to operate them when the bracelet is in position on the wrist of the wearer. Furthermore, many of these buckles are so complex in structure that it is very difficult to make the parts in proper dimensions, and the problem of assembly thereof is also difficult. The construction of many of these buckles is such that use thereof creates considerable wear and tear on the moving parts resulting in a short life. One of the objects of this invention is to provide a device for overcoming these difficulties as well as many others.

Figure 1:
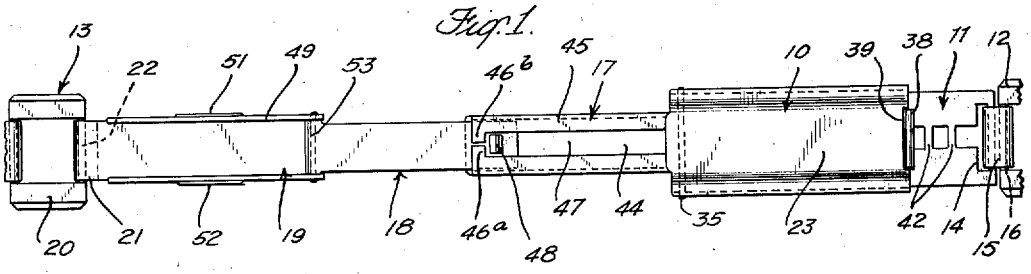

Referring to Figure 1, my buckle comprises a housing link generally indicated at 10 within which is slidably mounted a sliding link generally indicated at 11. Preferably sliding link 11 is secured to one end 12 of a bracelet generally indicated at 13 (only partially shown). Although end 12 of the bracelet may be secured to the sliding link in any convenient manner, I prefer to provide a slot 14 adjacent the end of sliding link 11 and a collar 15 extending through the slot and fitting about a cross-piece 16 of the end of the bracelet.

A link generally indicated at 17 is hingedly connected to housing link 10 in a manner to be described more fully hereinafter, and a link generally indicated at 18 is slidably mounted within link 17. Hingedly connected to link 18 is a link generally indicated at 19 having its end secured to the other end 20 of the bracelet 13. Preferably link 19 is connected to end 20 by an eye portion 21 fitting about the crosspiece 22 of the end link.

Figure 2:
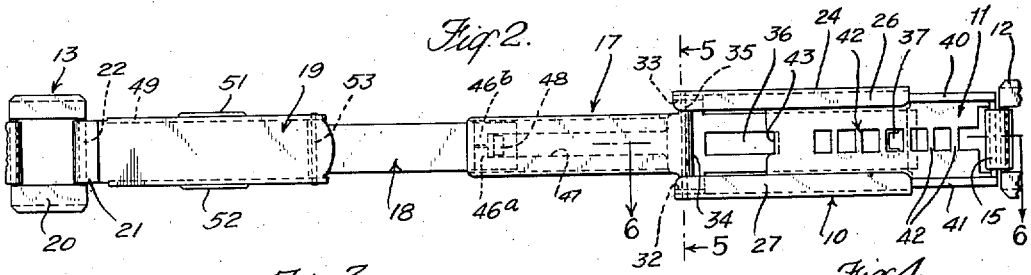
Figure 2 is a bottom plan view of the buckle shown in Figure 1.
Figure 4:
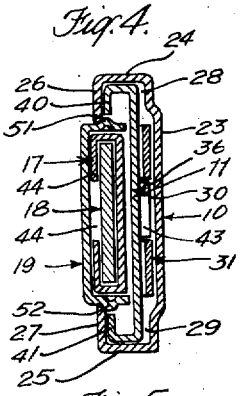
Figure 4 is a vertical sectional view taken along the line 4—4 of Figure 3, on an enlarged scale.

Referring more particularly to Figures 2 and 4, housing link 10 preferably comprises a top portion 23, longitudinal side walls 24 and 25, and inwardly extending flange portions 26 and 27 spaced below top portion 23, as best seen in Figure 4. Thus the opposite sides of housing link 10 take the form of longitudinal channels 28 and 29, channel 28 being bordered by top portion 23, side wall 24 and flange portion 26, while channel 29 is bordered by top portion 23, side wall 25 and flange portion 27.

Figure 5:
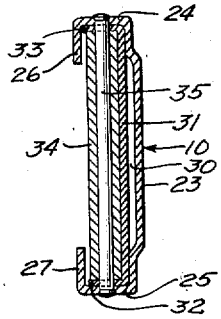
Figure 5 is a vertical sectional view taken along the line 5—5 of Figure 2.

Still referring to Figure 4, the section of top portion 23 substantially disposed between channels 28 and 29 is bent outwardly to form a longitudinal depression 30 within the housing link. As best shown in Figures 4 and 5, a movable part generally indicated at 31 is disposed within ridge 30 and is pivotally connected at the end of housing link 10 adjacent link 17. Thus part 31 has a pair of ears 32 and 33 (Figure 5) adjacent side walls 24 and 25, and an eye portion 34 on link 17 (Figure 2) bridges the space therebetween. Thus the ends of eye portion 34 as well as ears 32 and 33 fit underneath flange portions 26 and 27. A pin 35 extends through ears 32 and 33 and eye portion 35, and is preferably headed over on side walls 24 and 25. Accordingly pin 35 not only serves to hingedly connect link 17 to housing link 10 but also it secures part 31 within housing link 10 so that it is free to pivot in directions toward and away from top portion 23.

Figure 6:
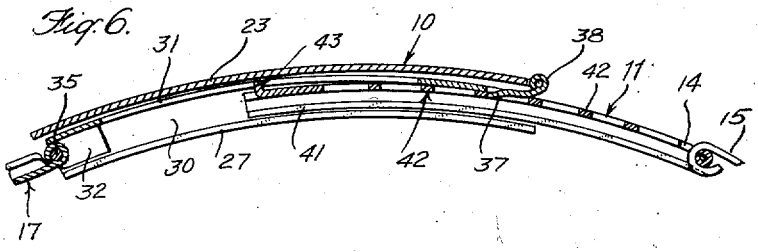
Figure 6 is a longitudinal vertical sectional view taken along the line 6—6 of Figure 2.
Figure 7:
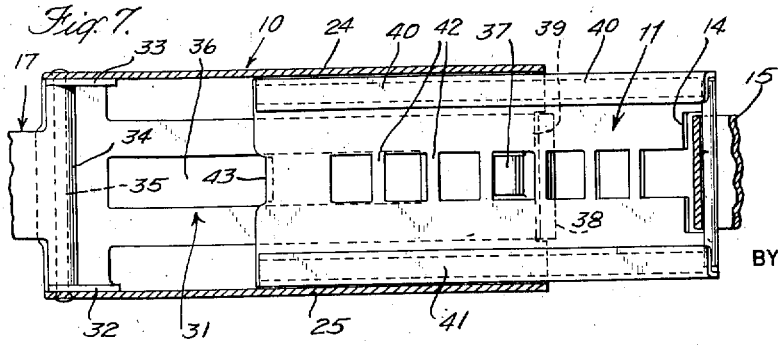
Figure 7 is a horizontal sectional view of the parts shown in Figure 6.

The central portion of part 31 is cut away to form a longitudinal slot 36, as best shown in Figures 2 and 7, while the end portion of part 31 opposite pin 35 has secured thereto a pawl or catch part 37. Preferably catch part 37 is an upturned cut out portion of part 31 as best shown in Figure 6. The end of part 31 is preferably bent over upon itself to form an eye portion 38 (Figure 6) located immediately adjacent the end of housing link 10. Preferably top portion 23 of the housing link is cut out forming an indentation 39 (Figure 1) within which fingerpiece 38 rests.

Referring now to Figures 4 and 7, sliding link 11 rests on top of part 31 as viewed in Figure 7. The sides of sliding link 11 are bent upwardly and inwardly to form ridge portions 40 and 41 fitting within channels 28 and 29 respectively (Figure 4). The dimensions of the sliding link are such that the sides of ridge portions 40 and 41 substantially engage side walls 24 and 25, whereas the depth of the ridge portions is much less than the depth of channels 28 and 29. Thus there is a substantial space between the inside surface of top portion 23 and the bottom surface of sliding link 11 as viewed in Figure 2. Accordingly part 31 is free to pivot about pin 35 between sliding link 11 and top portion 23 for a purpose to be more fully described hereinafter.

Formed along the central portion of sliding link 11 is a series of slots forming teeth generally indicated at 42. Teeth 42 are in line with pawl member 37 and consequently longitudinal movement of the sliding link with respect to the housing link results in an engagement of the pawl member with the several teeth. However, as best shown in Figure 6, pawl member 37 presents a sloping surface to the teeth when the sliding link is moved inwardly and an abrupt surface when any attempt is made to move the sliding link in the opposite direction. Accordingly the sliding link may move inwardly as the teeth will ride over the pawl member. But when part 31 is in its normal position, longitudinal movement of the sliding link in an outward or extended direction is prevented by engagement of one of the teeth with the abrupt side of pawl member 37. Should the wearer desire to move the sliding link outwardly to extend the bracelet, it is merely necessary to move part 31 against the top of the housing link by way of fingerpiece 38 to disengage pawl member 37 from the teeth. Preferably the inside end of sliding link 11 has a lip 43 extending into slot 36 (Figure 2) to serve as a guide during the longitudinal movement of the sliding link within the housing link and also to serve as a stop when the sliding link is in its outermost position.

Links 17, 18 and 19 may be of any desired construction to fit within housing link 10 between flange portions 26 and 27 (Figure 2). Preferably link 17 is channel shaped in cross section having inwardly extending flanges 44 and 45 and a pair of ears 46a and 46b bridging the end thereof to form a slot 47. Link 18 is slidably mounted within link 17 and has an upturned lip 48 disposed within slot 47 and shaped to engage ears 46a and 46b when link 18 is in extended position. Thus link 18 is free to slide in link 17 within the limits of the length of slot 47.

Links 18 and 19 are pivotally connected and link 19 is channel shaped in cross section having side walls 49 and 50 extending upwardly as viewed in Figure 1. Walls 49 and 50 are provided with longitudinal projections 51 and 52 (Figures 1 and 4) for a purpose to be described hereinafter.

As shown in Figure 4, flanges 26 and 27 and top portion 23 of housing link 10 form an elongated channel within link 10 in which sliding link 11 slides. Link 11 is spaced inwardly toward top portion 23 from flanges 26 and 27 to provide a nesting space for folding links 17, 18 and 19 in housing link 10 regardless of the longitudinal position of sliding link 11 therein.

As shown in Figure 6, my buckle is curved and much longer than it is thick, to provide ample extensibility and yet permit the buckle to lie flat against and conform to the wrist and preclude unsightliness and interference with the sleeve.

Figure 3:
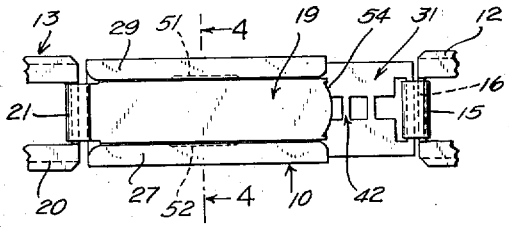
Figure 3 is a bottom plan view of my buckle with the links in folded position.

When the wearer desires to fold links 17, 18 and 19 into the nested position shown in Figures 3 and 4, link 18 first slides into link 17 while link 17 is pivoting about pin 35 (Figure 2) and link 19 is pivoting about its hinge connection 53 with link 18. Finally link 17, with link 18 disposed therein, rests between the flange portions 26 and 27 of the housing link and side walls 49 and 50 are disposed between the sides of link 17 and the flange portions of the housing link. Flange portions 26 and 27 are so proportioned that when links 17, 18 and 19 are so folded into the housing link, longitudinal projections 51 and 52 snap over the inner edges thereof to retain the links in this position. However the links may be conveniently released by pulling link 19 upwardly, as viewed in Figure 3, this being best accomplished by inserting the fingernail beneath a projection 54 extending from the end thereof.

Referring to Figure 4, it will now be seen that when links 17, 18 and 19 are in the closed or nested position, they are sufficiently spaced above sliding link 29 so that this member is free to slide into extended and contracted positions without hindrance. In normal use the bracelet, with my unique buckle secured thereto, is first slipped over the hand of the wearer while the buckle is in the extended position shown in Figures 1 and 2. Next links 17, 18 and 19 are moved into the nested position after which the wearer may get a fine adjustment of the length of the bracelet by moving the sliding link 11 in either direction. If the wearer desires to shorten the bracelet, it is merely necessary to move the sliding link further into the housing link as the teeth 42 (Figure 6) will ride over pawl member 37. However if the wearer desires to lengthen the bracelet slightly, he can do so by placing his fingernail beneath the fingerpiece 38 and pulling it upwardly as viewed in Figure 1. This moves pawl member 37 out of engagement with the teeth so that the sliding link is free to move outwardly with respect to the housing link.

It will thus be seen that my buckle offers a great variation in the adjustment of the length of a bracelet. Furthermore, regardless of the position of the folding links, the sliding link remains in any desired position until changed by the wearer. If the wearer desires to make a fine adjustment of the length of the bracelet this may be done by actuating the fingerpiece, and it is to be particularly noted that the fingerpiece is in a very accessible position where it may be conveniently operated. Furthermore, the various parts of my buckle are simple in construction, thus being easily manufactured and assembled.

Accordingly I have provided a thoroughly practical and efficient construction in which the several objects hereinabove mentioned are accomplished and in which the difficulties herein referred to as well as many others are successfully eliminated.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a bracelet construction, in combination, a bracelet, a link, a sliding link member mounted on said link for sliding longitudinal movement from one end of said link, a control member pivotally connected to said link for transverse movement only with respect to the longitudinal dimensions of said link, a finger piece on one end of said control member extending from said end to said link for operating said control member, one of said members having a series of ratchet teeth along a portion of its length and the other of said members having a pawl thereon, said pawl and said ratchet teeth being in juxtaposed relation upon said link so that transverse movement of said finger piece relative to said link separates said pawl and said ratchet teeth, a series of folding links pivotally connected to the other end of said first mentioned link to fold into a nested position with respect to said first mentioned link, and catch means associated with said first mentioned link and said folding links to hold said folding links in said nested position. one end of the bracelet being connected to said sliding link member and the other end of said bracelet being connected to said folding links.

2. In a bracelet construction, in combination, a bracelet, a link, a sliding link member mounted on said link for sliding longitudinal movement from one end of said link, a control member pivotally connected to said link for transverse movement perpendicularly with respect to the plane of said link, a finger piece on one end of said control member extending from said end of said link for operating said control member, one of said members having a series of ratchet teeth along a portion of its length and the other of said members having a pawl thereon, said pawl and said ratchet teeth being in juxtaposed relation upon said link so that upward perpendicular movement of said finger piece relative to the plane of said link separates said pawl and said ratchet teeth, a series of folding links pivotally connected to the other end of said first mentioned link to fold into a nested position with respect to said first mentioned link, and catch means associated with said first mentioned link and said folding links to hold said folding links in said nested position, one end of the bracelet being connected to said sliding link member and the other end of said bracelet being connected to said folding links.

3. As an article of jewelry, an extensible buckle greater in length than breadth, said buckle adapted to be used with a pair of bracelet sections which in turn are adapted to be attached to a wrist watch or the like, one of said sections including a plurality of folding links narrower than said buckle and shaped and adapted to fold into nested relationship within said buckle, said buckle comprising, in combination, a housing link adapted to be connected to one of said sections, said housing link having a top and longitudinal side walls, a sliding link member slidably retained between said walls of said housing link, a movable member substantially as long as said housing link pivotally connected to said housing link substantially adjacent one end thereof and located between said top of said housing link and said sliding link member, one of said members having a plurality of teeth formed thereon, a pawl connected to the other of said members, and a fingerpiece secured to said movable member and located substantially adjacent the end of said housing link opposite the end thereof to which said movable member is pivoted.

4. As an article of jewelry, an extensible buckle greater in length than breadth, said buckle adapted to be used with a pair of bracelet sections which in turn are adapted to be attached to a wrist watch or the like, one of said sections including a plurality of folding links narrower than said buckle and shaped and adapted to fold into nested relationship within said buckle, said buckle comprising, in combination, a housing link adapted to be connected to the end folding link of said last-mentioned section and having a top portion and opposed longitudinal wall portions extending therefrom to form an elongated channel, a sliding link member mounted on said link for sliding longitudinal movement relative thereto, said sliding link member being connected to the other of said bracelet sections and spaced from the bottom edges of said housing link wall portions so that said housing link is open at the bottom regardless of the position of said sliding link member to provide space for said folding links when in their nested position, a control member extending substantially throughout the length of said housing link, said control member having one end portion pivotally connected to said housing link so that it is movable transversely only with respect to the longitudinal dimensions of said link, a fingerpiece on the other end portion of said control member extending from one end of said housing link for operating said control member, one of said members having a series of ratchet teeth along a portion of its length and the other of said members having a pawl thereon, said pawl and said ratchet teeth being in juxtaposed relationship on said housing link so that transverse movement of said fingerpiece relative to said housing link separates said pawl and said ratchet teeth whereby said sliding link member is freely slidable on said housing link.

5. As an article of jewelry, an extensible buckle greater in length than breadth, said buckle adapted to be used with a pair of bracelet sections which in turn are adapted to be attached to a wrist watch or the like, one of said sections including a plurality of folding links narrower than said buckle and shaped and adapted to fold into nested relationship within said buckle, said buckle comprising, in combination, a link, a sliding link member mounted on said link for sliding longitudinal movement relative thereto, a control member extending substantially throughout the length of said link, said control member having one end pivoted to said link so that it is movable substantially transversely only with respect to the longitudinal dimensions of said link, a finger piece on the other end portion of said control member extending from one end of said link for operating said control member, one of said members having a series of ratchet teeth along a portion of its length and the other of said members having a pawl thereon, said pawl and ratchet teeth being in juxtaposed relationship on said link, so that transverse movement of said finger piece relative to said link separates said pawl and said ratchet teeth whereby said sliding link member is freely slidable on said link.

6. As an article of jewelry, an extensible buckle greater in length than breadth, said buckle adapted to be used with a pair of bracelet sections which in turn are adapted to be attached to a wrist watch or the like, one of said sections including a plurality of folding links narrower than said buckle and shaped and adapted to fold into nested relationship within said buckle, said buckle comprising, in combination, a link, a sliding link member mounted on said link for sliding longitudinal movement relative thereto, a control member extending substantially throughout the length of said link between the top side of said link and said sliding link member, one end of said control member being connected to said link, and the other end thereof being free to move transversely only with respect to the longitudinal dimensions of said link, a finger piece secured to the last-mentioned end of said control member and extending from one end of said link for operating said control member, one of said members having a series of ratchet teeth along a portion of its length and the other of said members having a pawl thereon, said pawl and said ratchet teeth being in juxtaposed relationship on said link so that transverse movement of said finger piece relative to said link separates said pawl and said ratchet teeth whereby said sliding link member is freely slidable on said link.

7. An extensible buckle for a wrist watch bracelet or the like comprising, in combination, a housing link having a top and longitudinal side walls, a sliding link member slidingly retained between said walls and said housing link, a movable member disposed within and substantially as long as said housing link and having one end pivotally connected to said housing link substantially adjacent one end thereof, said movable member being spaced from the top wall of said housing link so as to be movable transversely with respect thereto, one of said members having a plurality of teeth formed thereon, a pawl connected to the other of said members and releasably engageable with said teeth, and a finger piece secured to said movable member and extending from the other end of said housing link, said finger piece being operable to move said movable member in a direction to disengage said pawl and teeth whereby said sliding link member and said housing link may be moved relative to one another.

EMIL HAEFFNER.